Jan. 13, 1970    J. DE LA CIERVA    3,489,486
FLUID-FILLED REFLECTING PRISM
Filed Sept. 15, 1966
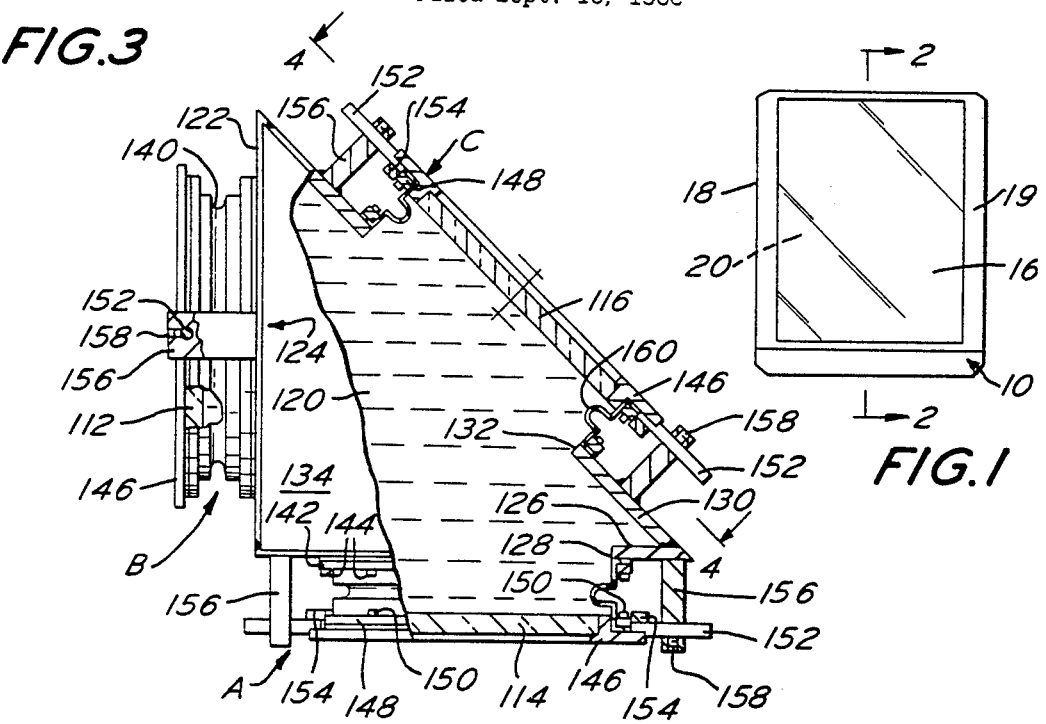
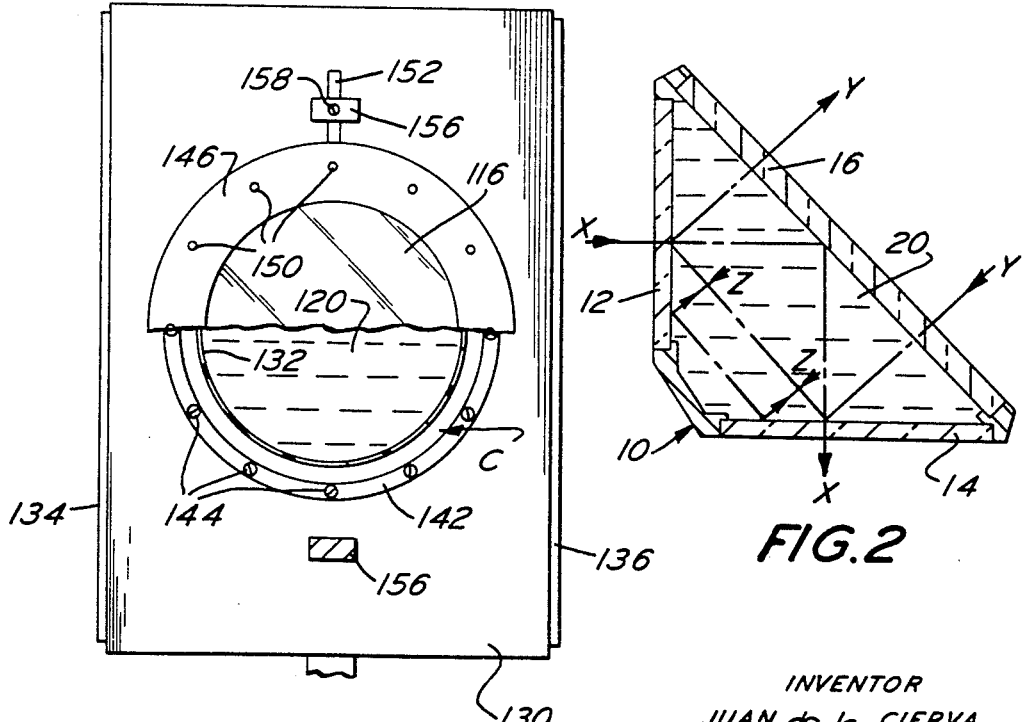
INVENTOR
JUAN de la CIERVA
BY
Bilker Kimmelman & Meyerman
ATTORNEYS United States Patent Office 3,489,486
Patented Jan. 13, 1970

3,489,486
FLUID-FILLED REFLECTING PRISM
Juan de la Cierva, Oreland, Pa., assignor to Dynasciences Corporation, Blue Bell, Pa., a corporation of Pennsylvania
Filed Sept. 15, 1966, Ser. No. 579,690
Int. Cl. G02b 5/04
U.S. Cl. 350—286                                  6 Claims

---

ABSTRACT OF THE DISCLOSURE

A fluid-filled optical prism in which transparent transmitting and reflecting plates encapsulate therebetween a liquid of substantially the same index of refraction. The plates are adjustable with respect to each other along mutually perpendicular axes which are normal to the optical path through the prism to permit precise orientation of the transmitting and reflecting surfaces in both azimuthal and pyramidal directions without regrinding or hand polishing.

---

This invention relates to reflecting prisms, and more particularly relates to prisms having at least one reflecting surface for deviating a light beam through a predetermined angle.

In the manufacture of prisms, it is the usual practice to mold glass blanks having the approximate configuration of the finished part or to cut the blanks from large slabs of optical glass and then grind and polish the faces of the blanks to the exacting dimensions, angles and surface flatness usually required of precision optical components. As is well known, extreme care and long periods of time are required to cast large pieces of optical glass in order to avoid bubble formations, striations and stress and strain lines within the component part. That is, dislocations and faults create optical aberrations, including shadowing, astigmatism, reduction in light transmission or reflection, and other distortions which severely limit optical performance. Accordingly, it is quite expensive to purchase high quality, raw blanks. In addition, it is also costly to finish the components because of the degree of care required in the handling of the already expensive parts during grinding, polishing and/or coating. Furthermore, it is to be recognized that a solid chunk of glass or even quartz is very heavy in that its specific gravity ranges from slightly greater than twice that of water in the case of fused quartz or silica to more than six times that in the case of flint or lead glasses. Thus, it is readily apparent that where a relatively large prism is required as, for example, one with an aperture in excess of six inches in diameter or one requiring the extension of light path, the weight of such a component may be prohibitive particularly in aircraft or space vehicles.

In addition to the above, it may frequently be desirable to provide a means for permitting adjustment of the prism angles with respect to one another subsequent to the polishing operation. Such re-orientation of the relationship of the prism's angles would prove useful in deflecting the light beam in compensation of angular deviations in light path caused by roll, pitch, yaw or displacement of the target with respect to the optical system (i.e. camera, telescope). Such utility is exemplified by a non-reflecting system in the variable angle fluid transmitting wedge shown in my prior U.S. Patent No. 3,212,420, entitled "Image Motion Compensator." However, even apart from motion compensation, a variable angle reflecting prism can provide an important and significant improvement in prism fabrication procedures when grinding and polishing does not yield the required angular relationship or pyramidal tolerance. Lastly, a variable angular disposition of the prism angles would be extremely desirable in the manufacture of "roof" inversion prisms, such as amicis or penta roofs where the final correction of the roof angle to within one second or arc is now accomplished by painstaking and laborious hand polishing.

It is therefore an object of this invention to provide a reflecting prism at an appreciable reduction in weight and cost.

Another object of this invention is to provide a large fluid-filled reflecting prism of superior optical quality which can be made of any size and/or configuration.

Still another object of this invention is to construct a fluid-filled reflecting prism whose angular configuration can be adjusted subsequent to grinding and polishing.

Yet another object of this invention is to provide a high quality, low-cost, minimum weight reflecting prism of large aperture and/or long light path.

Yet a further object of this invention is to provide a reflecting prism whose index of refraction can be varied.

Still a further object of this invention is to provide an image motion compensating reflecting prism.

A further object of this invention is to provide a new and novel method for fabrication of roof prisms.

Other objects of this invention are to provide an improved device of the character described, which is easily and economically produced, sturdy in construction, and both highly efficient and effective in operation.

With the above and related objects in view, this invention consists of the details of construction and combination of parts, as will be more fully understood from the following detailed description when read in conjunction with the accompanying drawing, in which:

FIGURE 1 is a front elevational view of a liquid filled reflecting prism embodying this invention.

FIGURE 2 is a sectional view taken along lines 2—2 of FIGURE 1.

FIGURE 3 is a side elevational view, and partly in section, of a liquid filled reflecting prism having angularly adjustable face orientation means embodying this invention.

FIGURE 4 is a sectional view taken along lines 4—4 of FIGURE 3.

Referring now in greater detail to the drawing in which similar reference characters refer to similar parts, the fluid-filled prism of FIGURES 1 and 2 comprises an aluminum casting 10 having three rectangular windows therein which respectively contain transparent glass plates 12, 14 and 16. Side walls 18 and 19 complete the casting 10. With the glass plates 12, 14 and 16 secured and sealed by suitable gaskets within the windows, a hermetically sealed container is formed for encapsulating a liquid 20.

All of the glass plates 12, 14 and 16 are ground and highly polished optical flats, approximately ⅜ inch thick, lapped on each of the exterior faces to within a few optical interference fringes. The encapsulated fluid 20 may be one or a combination of organic and/or inorganic liquids or water so as to produce a refractive index matching that of the particular galss plates utilized. Some examples of liquids which may be employed are benzene, ethylether, glycerol, ethyl alcohol, phenol, bromine, etc.

The refractive index can be computed from the Lorenz and Lorenz equation $$K=\frac{n^2-1}{n^2+2}\times\frac{1}{d}$$

where:

K=specific refraction
n=index of refraction of a liquid at a given temperature
d=density of substance at same temperature The product M times K (molecular refraction) is additive and can be calculated for most organic liquid compounds from atomic and structural constants, M being the molecular weight of the component or element.

Referring to FIGURE 2, rays of light X—X, Y—Y and Z—Z have been diagrammatically included to show various manners of use of the liquid-filled prism embodying this invention and each define a corresponding optical axis. For example, the broken line X—X shows use as a right angle (90° deviation) prism having a single reflecting face in this case, hypotenuse 16, whereas faces 12 and 14 are transmitting surfaces. The broken line Y—Y demonstrates use of the liquid prism as a porro prism wherein faces 12 and 14 are each reflection surfaces to deviate the beam Y—Y through 180° whereas face 16 would be a transmitting surface. Lastly, the broken lines Z—Z demonstrate or rather partially exhibit use as a roof prism (in this case actually incomplete since the transmitting surfaces are not shown) for example, an amici prism or pentaroof prism to provide image reversion.

As is apparent where the index of refraction of the liquid element 20 matches that of the glass plates, there would be no refraction at any liquid-glass interface. Furthermore, where total reflection occurs within the same medium, there is no light loss. Accordingly, the only light losses occurring as a result of reflection in the instant fluid-filled prism would be solely at a glass-to-air interface, i.e. through transmitting surfaces only.

Therefore, maximum light losses due to reflection at transmitting surfaces would be approximately 4% per transmitting surface by computation from Fresnel's law, as follows:

$$\text{Percent loss} = \frac{I}{I_0} = \frac{(N-1)^2}{(N+1)^2}$$

where:

$N$=index of refraction of liquid or glass employed with respect to air $I/I_0$=fraction of light reflected at transmitting surface Also apparent is the fact that the liquid-glass interfaces do not truly exist as light refracting boundaries where the refractive indices of the liquid and glass are identical. Therefore, the internal surfaces of the glass plates need not be polished to the same high optical quality as the external (glass-to-air) surfaces. Furthermore, the savings in weight of the fluid prism is readily apparent when it is noted that the approximate specific gravity of ethylether is 0.794, benzene 0.879, glycerol 0.708 as compared to an average crown glass specific gravity of 2.6.

In FIGURES 3 and 4, there is shown a modification of the fluid-filled prism invention which includes orienting means A, B and C for angularly disposing glass plates 112, 114 and 116 with respect to each other about an encapsulated liquid element 120. In this embodiment, metal plate 122 having a window aperture or port 124 is welded or cast at right angles to a second plate 126 having port 128. Hypotenuse plate 130 with window 132 is welded to the extremities of the right angle plates 122 and 126. Triangular end plates 134 and 136 are welded to the lateral edges of the plates 122, 126 and 130 to define side walls for the container. All of the metal plates are preferably formed from aluminum alloy, ⅛ inch to ¼ inch thick and having a clear chromic anodized coating.

The glass plate orienting means A and B are identical and each constitutes a liquid-impervious flexible bellows member 140 of generally cylindrical configuration. One end of each of the bellows members 140 is clamped about the respective ports 124 and 128 by flanges 142. The flanges 142 are held in watertight disposition against the respective plates 122 and 126 by a plurality of circumferentially-spaced socket head cap screws 144 which are threaded within complementary tapped holes in the metal plates. The glass plates 112 and 114 are retained within suitable liquid tight cells 146, and the exterior ends of the bellows 140 are peripherally clamped to the cells by rings 148 and flat head socket screws 150. Trunnions 152 outwardly extend from each side of the cells 146 and to which they are clamped by brackets 154. The ends of the trunnions 152 are pivotally supported within posts 156 projecting from the faces of plates 122 and 126 beyond the clamping bolt circle of the ports. Set screws 158 at the ends of the posts 156 bear against the trunnions and permit frictional adjustment in degree of pivotal rotation.

It is to be observed that the pivotal disposition of the orienting means B is about an axis perpendicular to the plane of the paper, as shown in FIGURE 3, so that the orientation of plate 112 would deviate a light beam about the prismatic azimuth. That is, orientation of the plate 112 would cause a ray of light entering that face to be deviated at some ± angle with respect to 90° through which a right angle prism normally deflects a ray. Correspondingly, the plate 114 is pivotally supported about an axis lying parallel to the plane of the paper and orthogonal to the axis of plate 112. Accordingly, orientation of plate 114 would cause deflection of a beam of light in a pyramidal or tilt direction (perpendicular to the arris of plates 112 and 114). The development of the equations for the degree of angular deviation provided by the prismatic wedge effect of plates 112 and 114 can be determined by conventional physical and geometric principles. Prior art reference may also be made to my prior Patent No. 3,212,420, entitled "Image Motion Compensator." It is also to be observed that suitable linkages and sensor systems (not shown) similar to the measuring and compensation construction described and shown in said Patent No. 3,212,420 can be easily incorporated with the present fluid prism of FIGURES 3 and 4 so as to provide a continuous image correction device. In addition, the orientation means A and B can be secured in a stationary position after the prism angle (90°) and pyramidal error (tilt) has been corrected. Adjustment of the latter fixed type is employed solely for the purpose of prism fabrication procedures.

The orienting means C may be identical to that of A and B although the size of bellows 160 can be appropriately sized to accommodate the circumferential image projection of glass plates 112 and 114 on the hypotenuse 116.

As is apparent from the foregoing description, the modified fluid-filled prism of FIGURES 3 and 4 can also be used as a right angle prism, a porro prism, or roof prism. Its adjusting principles can similarly be applied to the manufacture of any reflecting prism utilizing a different angle of deviation from 90° or in the correction of the prism roof angle to within a fraction of a second of arc. Still other prism configurations adapted to be made in accordance with the instant invention are rhomboid prisms, dove prism, and pechan prisms, etc.

Furthermore, the automatic adjustment of the faces 112 and 114 with respect to each other by utilizing sensing and compensation control devices of my prior patent is well adapted for providing image motion or angular deviation correction with a reflecting prism. That is, automatic image motion compensation by a reflecting prism might be compared to the total transmission fluid wedge of said Patent No. 3,212,420. Thus, orientation of face 112 could provide compensation for angular deviations in a "pitch" direction or for motion along the line of travel of a vehicle. Orientation of face 114 could provide compensation for deviations resulting from "roll" motion. Finally, use of the orientation means C operating upon the reflecting surface 116 would provide compensation along still another degree of freedom, that of "yaw" or "crabbing" motion.

Although this invention has been described in considerable detail, such description is intended as being illustrative rather than limiting since the invention may be variously embodied and the scope of the invention is to be determined as claimed.

What is claimed is:

1. An optical reflecting prism comprising a casing including at least three sides oriented in polygonal disposition with respect to each other along an optical axis of the prism and having apertures in respective polygonally disposed sides, a transparent plate corresponding to each of the apertured sides, means constituting bellows coupling said transparent plates about the respective apertures, and a fluid having an index of refraction substantially the same as the index of refraction of said transparent plates encapsulated therebetween within said casing, at least one of the surfaces of at least one of said transparent plates being arranged to constitute a reflective face with respect to a ray passing through said prism along the optical axis thereof, means for orienting at least one of said plates about a first axis orthogonal with respect to the optical axis and being so constructed and arranged to compensate for deviation of the ray in an azimuth direction, and means for orienting at least one other of said plates about a second axis orthogonal with respect to the optical axis and normal to the said first axis and being so constructed and arranged to compensate for deflection of the ray in an elevational direction, whereby the prismatic angular and pyramidal configuration may be trued up without regrinding or hand polishing.

2. The invention of claim 1 wherein said transparent plates are oriented in triangular configuration.

3. The invention of claim 2 wherein said transparent plates are oriented as a right angle prism.

4. The invention of claim 3 wherein said right angle prism comprises a porro prism.

5. The prism of claim 1 wherein each of said means for orienting includes means for pivoting said plates.

6. The prism of claim 5 wherein each of said means for pivoting includes a trunnion projecting from the corresponding plate and a bearing for rotatably supporting the corresponding trunnion along an axis normal to the optical path.

References Cited
UNITED STATES PATENTS

| | | | |
|---|---|---|---|
| 71,309 | 11/1867 | Kane | 350—286 |
| 695,606 | 3/1902 | Grun | 350—179 |
| 757,900 | 4/1904 | Englund. | |
| 2,135,531 | 10/1938 | Reichert | 350—287 |
| 2,504,039 | 4/1950 | O'Leary | 350—286 X |
| 3,212,420 | 10/1965 | De La Cierva. | |

DAVID SCHONBERG, Primary Examiner

A. OSTRAGER, Assistant Examiner